United States Patent [19]
Mousel

[11] 3,940,000
[45] Feb. 24, 1976

[54] UNIVERSAL HYDRAULIC LIFT ATTACHMENT FOR TRACTORS

[76] Inventor: C. K. Mousel, Arapahoe, Nebr. 68922

[22] Filed: May 16, 1974

[21] Appl. No.: 470,588

[52] U.S. Cl. .............................. 214/766; 172/491
[51] Int. Cl.² .......................................... E02F 3/62
[58] Field of Search ..... 214/130 R, 766; 280/456 R, 280/457, 461 A, 477, 490 A; 172/491, 680; 180/53 C; 254/124

[56] References Cited
UNITED STATES PATENTS

| | | | |
|---|---|---|---|
| 2,470,242 | 5/1949 | Felsing | 280/477 |
| 2,549,734 | 4/1951 | White | 172/491 |
| 2,619,016 | 11/1952 | Dooley | 172/491 |
| 2,757,591 | 8/1956 | Stafford | 172/491 |
| 3,536,222 | 10/1970 | Patnode | 214/766 |

FOREIGN PATENTS OR APPLICATIONS

| | | | |
|---|---|---|---|
| 1,431,420 | 3/1969 | Germany | 214/766 |
| 226,599 | 8/1962 | Austria | 214/766 |
| 510,150 | 2/1955 | Canada | 254/124 |

*Primary Examiner*—Robert J. Spar
*Assistant Examiner*—Ross Weaver
*Attorney, Agent, or Firm*—Larson, Taylor & Hinds

[57] ABSTRACT

The present invention relates to a hydraulic lift attachment that is universally attachable to almost all makes and models of tractors. In one embodiment, the lift attachment comprises a frame, a hollow support member rigidly attached to and depending from the frame, and a boom pivotably mounted at one end to the frame and extending rearwardly therefrom. A hydraulic piston assembly is connected between the boom and the frame and operates off the tractor's hydraulic system for pivotably moving the boom. The frame is primarily supported by the tractor draw bar which is inserted in the support member and secured thereto with removable bolts. Two chains, rigidly attached at one end to respective sides of the frame, are connectable at the other end to the lift arms of the tractor's three point hitch and provide additional support for the frame.

7 Claims, 5 Drawing Figures

UNIVERSAL HYDRAULIC LIFT ATTACHMENT FOR TRACTORS

BACKGROUND OF THE INVENTION

1. Field of the Invention

The present invention relates to an improved attachment for tractors and in particular relates to a rear mounted hydraulic hoisting device attachable to a tractor and operable from the tractor hydraulic system.

2. Description of the Prior Art

The prior art contains many examples of hydraulically operated attachments connectable to tractors. However, because there is no standardization in design of tractors, serious difficulties are encountered when the same attachment is to be used with a number of different makes and models of tractors. Some of the important features which vary on the differing makes and models of tractors include the length of the draw bar lift arms, the length and size of the draw bar, the orientation of the draw bar, the type of hitch assembly, and the rear end structure of the tractors.

Many of the examples in the prior art of tractor attachments which have been designed to be mounted universally on all makes and models of tractors have been found to be extremely complex in their design, relatively quite heavy, and difficult to attach and remove from the tractors. Examples of hoist attachments of this type can be found in the Davies patent, U.S. Pat. No. 2,554,900 and the Schaich patent, U.S. Pat. No. 2,670,175. On the other hand, some of the prior art tractor attachments which do have a simplicity of design, have been found to lack sufficient structural strength to lift heavy loads.

Summary of the Invention

Accordingly, the present invention provides a structurally sturdy hydraulic lift attachment for tractors which is easily mounted and detached from the tractor frame. In addition, the present invention provides the advantage that it is universally adaptable to almost every make and model of tractor.

In accordance with one embodiment of the invention, the hydraulic lift attachment for tractors includes a frame mountable on and attachable to the draw bar of the tractor and a means for rigidly mounting the frame onto the draw bar. Two elongated connecting means are respectively connected at one end to the frame and are connectable at the other end to a corresponding arm of the tractor hitch assembly. A boom is pivotably mounted to the frame and extends outwardly therefrom and is raised and lowered with a hydraulic means which is connectable to the hydraulic system of the tractor.

Other features and advantages of the invention are set forth in or are apparent from the detailed description of presently preferred embodiments thereof found hereinbelow.

BRIEF DESCRIPTION OF THE DRAWINGS

In the drawings in which like reference numerals denote like elements.

DETAILED DESCRIPTION OF PRESENTLY PREFERRED EMBODIMENTS

Figure 1:
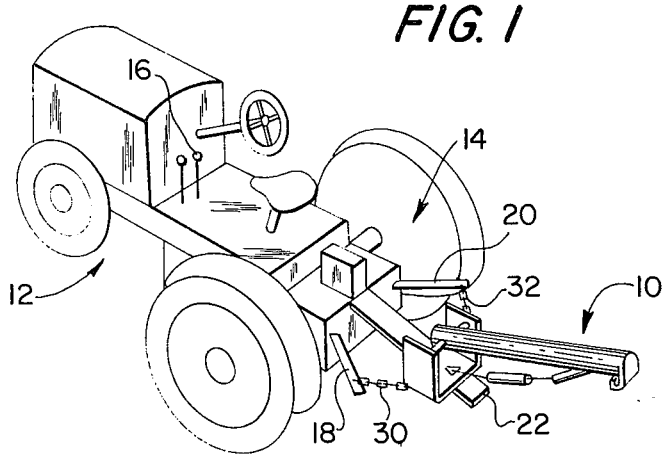
FIG. 1 is a perspective view of a tractor having a lift attachment in accordance with one embodiment of the invention mounted at the rear end thereof.

A presently preferred embodiment of a hydraulic lift attachment 10 is shown connected to the rear of a tractor 12. Tractor 12 is exemplary of a particular make and model of a farm tractor which is provided with a hydraulic system for operating the tractor's three point hitch and draw bar assembly 14, as well as operating a number of tractor attachments such as hydraulic lift attachment 10. The tractor hydraulic system is generally operated by positioning one of a plurality of levers 16. The three point hitch and draw bar assembly 14 is comprised of arms 18 and 20 and a draw bar extending longitudinally rearwardly from tractor 12.

Figure 2:
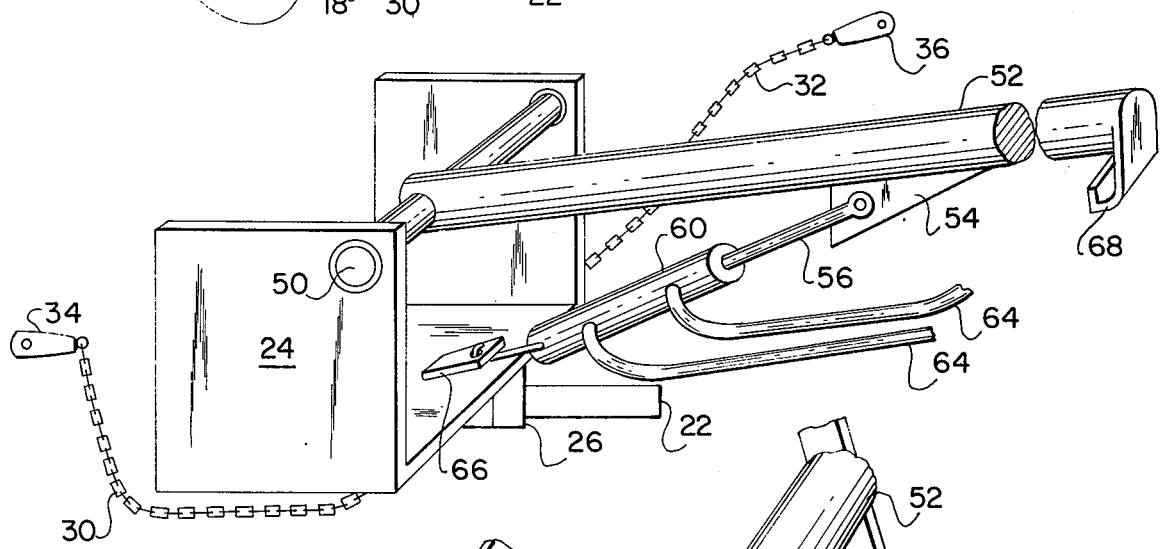
FIG. 2 is an enlarged perspective view taken from the side of the lift attachment shown in FIG. 1.
Figure 3:
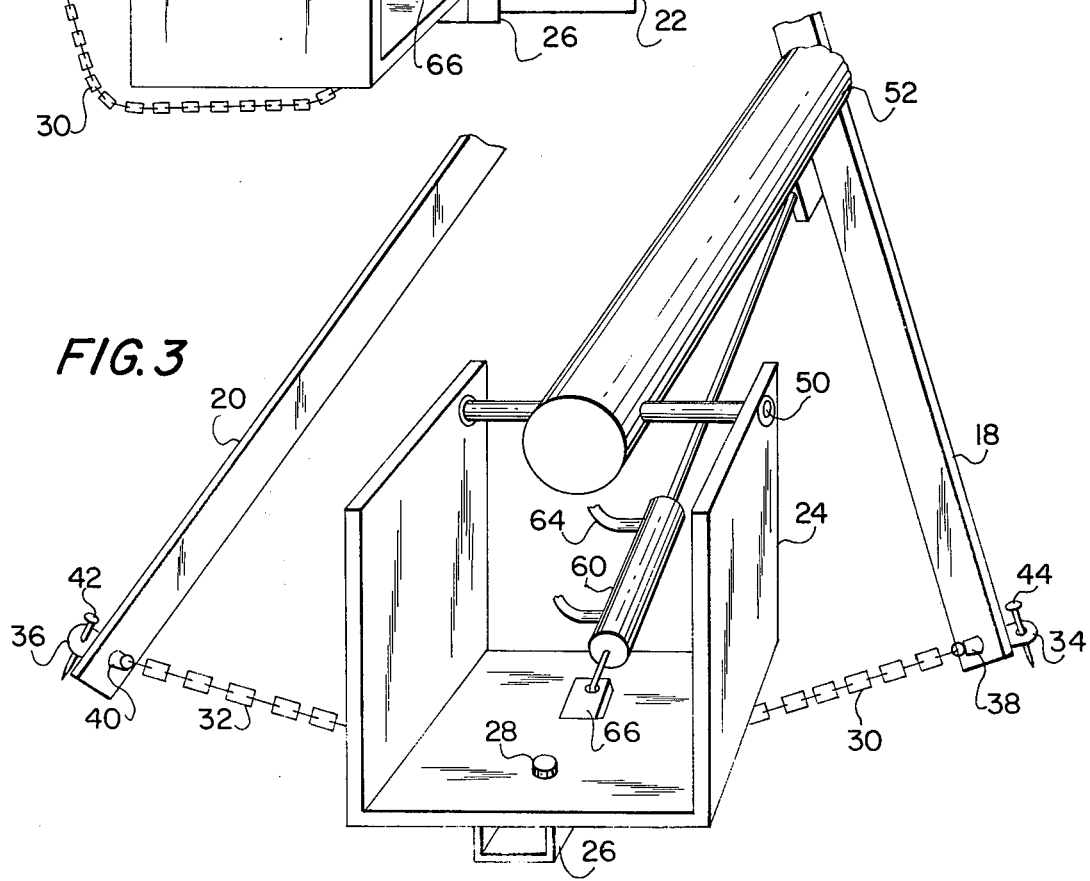
FIG. 3 is a perspective view taken from the end of the lift attachment shown in FIG. 1.

Hydraulic lift attachment 10 is shown in greater detail in FIGS. 2 and 3. Attachment 10 comprises a U-shaped frame which can be made from heavy guage steel plate. Frame 24 extends in a transverse direction and has a channel iron 26 welded to the underside thereof for receiving draw bar 22. A bolt 28 extends through the base of frame 24 and passes through any one of a plurality of orifices in draw bar 22 for retaining draw bar 22 within channel iron 26. Frame 24 is supported on tractor 12 by both draw bar 22 and two elongate connecting means such as flexible connectors or chains 30 and 32. One end of chains 30 and 32 is rigidly attached to respective ends of the bottom of frame 24 such as by being welded thereto. The other ends of chains 30 and 32 terminate in pins 34 and 36 are removably insertable into orifices 38 and 40 located at the ends of arms 18 and 20 respectively. Pins 34 and 36 have removable bolts 42 and 44 extending through orifices in the pins for preventing disengagement of pins 34 and 36, and hence chains 30 and 32, from arms 18 and 20.

In the embodiment shown in FIGS. 1, 2, and 3, frame 24 is further comprised of a tubular member 50 rigidly attached at the upper rearward corners of the sides of frame 24. A boom 52 is journaled at one end to and pivots about tubular member 50. A mounting gusset plate 54 is rigidly secured to a mid portion of boom 52 and receives one end of a piston rod 56 which is pivotably attached thereto. Piston rod 56 is part of a piston assembly 58 which further includes a cylinder 60, flexible hydraulic supply and return hoses 64 which are connectable to the main hydraulic system of tractor 12, and a mounting bracket 66 which mounts piston assembly 58 to the bottom plate of frame 24. The other end of boom 52 terminates in at least one hook 68 to which a load to be lifted can be attached.

Figure 4:
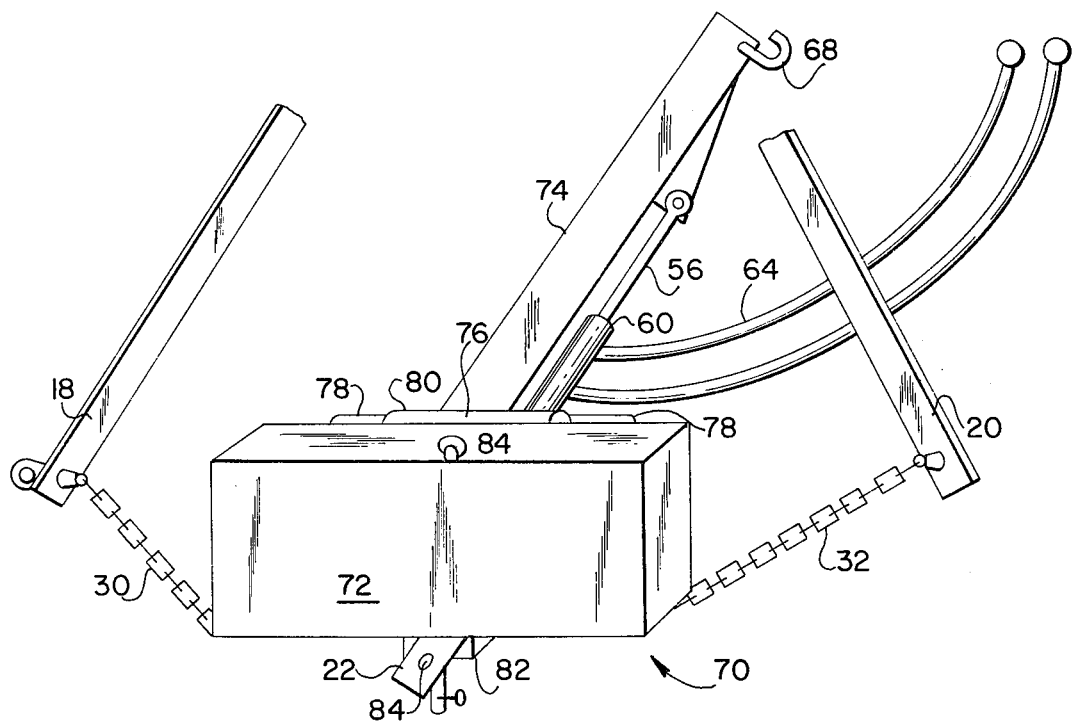
FIG. 4 is a perspective view taken from the end of a second embodiment of a lift attachment in accordance with the invention.
Figure 5:
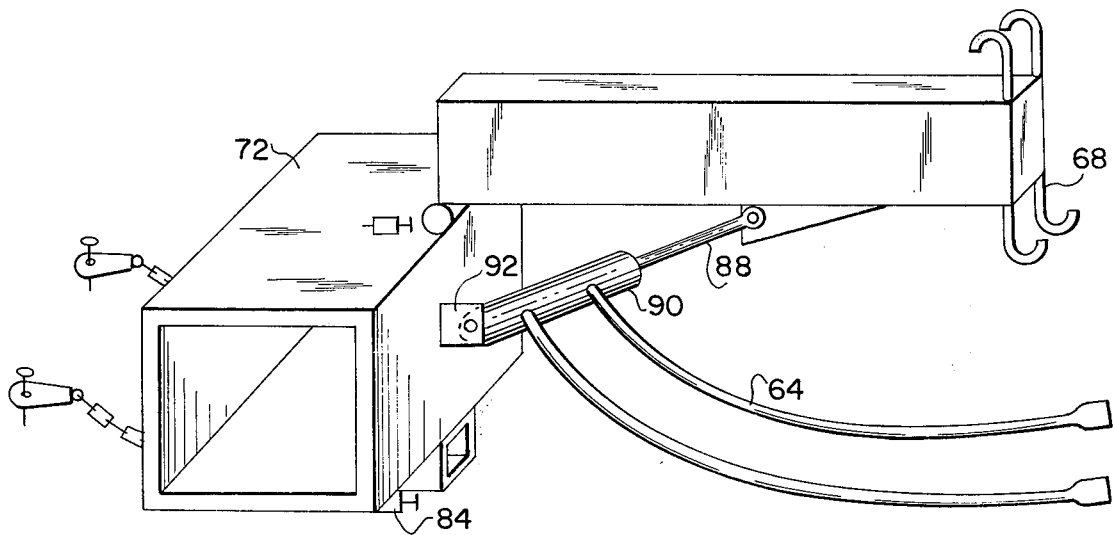
FIG. 5 is a perspective view taken from the side of the embodiment of the invention shown in FIG. 4.

In a second embodiment of the invention, shown in FIGS. 4 and 5, the hydraulic lift attachment 70 is comprised of a rectangular, open ended and hollow, box like frame 72 and a rectangular shaped boom 74 pivotably connected at the rearward upper corner of frame 72 with a hinge member 76. Hinge member 76 comprises a shaft 78 welded at the ends thereof to frame 72 so as to provide a central section of shaft 78 spaced from frame 72. A sleeve 80 is rigidly connected to boom 74 and is concentrically and pivotably mounted around the central section of shaft 78, thereby permitting pivotable movement of boom 74. Rigidly mounted on the bottom of frame 72 is a channel iron member 82 having a channel therein for receiving draw bar 22 of the tractor. Draw bar 22 is retained inside channel iron member 82 with a removable pin 84 which extends vertically through frame 72, channel iron member 82, into one of a number of orifices 86 in draw bar 22, and out the bottom side of channel iron member 82. If desired, more than one pin 84 can be used to secure frame 72 to draw bar 22. Attached to boom 74 is one end of a piston rod 88, the other end of which is slidably mounted inside a cylinder 90 and is positionable by hydraulic fluid supplied through hoses 64. The other end of cylinder 90 is pivotably mounted onto a hinge 92 which can be rigidly mounted anywhere along the vertical face of frame 72 as the particular design of lift attachment 70 requires. The remaining element of lift attachment 70 are similar to corresponding elements of lift attachment 10 shown in FIGS. 1–3, and have been designated with the same numbers.

In operation, the hydraulic lift attachment can be easily and quickly mounted to a tractor having either a two or a three point hitch. Referring to FIG. 1, the lift attachment is supportably mounted onto draw bar 22 which has been inserted into channel iron 26 and retained therein through the placement of bolts 28. Chains 30 and 32 are connected to arms 18 and 20, respectively, by inserting pins 34 and 36 in orifices located near the ends of arms 18 and 20. Then, arms 18 and 20 are pivotably raised by the tractors's hydraulic system controlled by lever assembly 16. Arms 18 and 20 are raised an amount sufficient so that frame 24 obtains some support therefrom. Once hydraulic lift attachment 10 has been mounted as above, it is ready for use.

It is apparent from the foregoing that the hydraulic lift attachment of this invention provides a lightweight yet sturdy and rugged attachment that can be easily and quickly mounted onto the rear of almost every make and model of tractor. Other modifications and variations can be made to the invention. Thus, the frame of the hydraulic lift attachment can be mounted onto the tractor's draw bar by a mounting means comprising a plurality of separable elongated members, one of which is rigidly mounted to the bottom of the frame and is positioned on top of the draw bar, and the other of which is positioned under the draw bar and the two members are being bolted together.

Although the invention has been described in detail with respect to an exemplary embodiment thereof, it will be understood by those of ordinary skill in the art that still further variations and modifications may be effected within the scope and spirit of the invention.

What is claimed is:

1. A hydraulic lift assembly attachable to a tractor having a draw bar, a hitch with vertically pivotable arms, and a hydraulic system for operating the arms and connectable hydraulic attachments, said lift assembly comprising:
   a frame mountable on and attachable to the draw bar;
   means for mounting said frame to the draw bar;
   two elongated connecting means, each connecting means connected at a first end to said frame and connectable at the other end to a corresponding arm of the hitch, said lift assembly removably mounted on and primarily supported by said draw bar and additionally supported and stabilized by the lift arms through said connecting means;
   a boom pivotably mounted to said frame and extending outwardly therefrom;
   and hydraulic piston means for raising and lowering said boom, said hydraulic piston means mounted at one end to said frame and mounted at the other end to said boom and connectable to the hydraulic system of the tractor.

2. A hydraulic lift as claimed in claim 1 wherein said frame is generally U-shaped in cross section and is comprised of a base and two upstanding sides attached to said base; and
   wherein said mounting means comprises a support member depending from said base and rigidly attached thereto, said support member having a channel therein for receiving the draw bar, and a removable bolt extending through orifices in said base, said support member and said draw bar for rigidly attaching said frame to said draw bar.

3. A hydraulic lift as claimed in claim 2 wherein said frame further comprises a mounting member rigidly attached at each end to said upstanding sides in the upper rearward corner thereof, and wherein said boom is pivotably mounted at one end to said mounting member.

4. A hydraulic lift as claimed in claim 1 wherein each said connecting means is comprised of a chain rigidly fastened at one end thereof to said frame, a pin connected to the other end of said chain for extending through an orifice in the end of the arm of the hitch, said pin having an orifice therethrough, and a removable bolt located in said orifice of said pin for retaining said chain in the orifice of the arm.

5. A hydraulic lift as claimed in claim 1 wherein said frame comprises a rectangular box shaped member having a bore completely therethrough, and said boom is pivotably connected at one end to the top rearward corner of said box shaped member.

6. A hydraulic lift as claimed in claim 1 wherein said connecting means comprises a flexible connecting means.

7. In a tractor including a draw bar, at least two hydraulically actuated pivotably mounted hitch arms extending rearwardly of the tractor on either side of said draw bar, hydraulic piston means for hydraulically raising and lowering said hitch arms, and hydraulic fluid supply means in fluid communication with said hydraulic piston means, the improvement which comprises a readily removable lifting device, said lifting device comprising:
   a frame member removably mounted on and secured to said draw bar;
   a boom pivotably mounted on said frame member;
   means removably connecting said frame member and said hitch arms such that said lifting device is removably mounted on and primarily supported by said draw bar and is additionally supported and stabilized by said hitch arms through said connecting means;
   further hydraulic piston means for raising and lowering said boom; and
   means for removably connecting said further hydraulic piston means with said hydraulic fluid supply means.

* * * * *